D. W. JACOBY.

Assignor to J. A CHESNUT and A. McKIM DUBOIS.

CORN-PLANTER.

No. 7,527. Reissued Feb. 20, 1877.

Witnesses.
R. Rupsport.
Jno. D. Patten

D. W. Jacoby
Inventor.
D. P. Holloway & Co
Atty

N. PETERS, PHOTO-LITHOGRAPHER, WASHINGTON, D. C.

UNITED STATES PATENT OFFICE.

D. W. JACOBY, OF SHELBYVILLE, ASSIGNOR TO JOHN A. CHESNUT, OF SPRINGFIELD, AND A. McKIM DUBOIS, OF CARLINVILLE, ILLINOIS.

IMPROVEMENT IN CORN-PLANTERS.

Specification forming part of Letters Patent No. 68,443, dated September 3, 1867; reissue No. 7,527, dated February 20, 1877; application filed November 4, 1876.

*To all whom it may concern:*

Be it known that I, D. W. JACOBY, of Shelbyville, in the county of Shelby and State of Illinois, have invented a new and useful Improvement in Corn-Planters, of which the following is a specification:

The subject of this improvement is the mechanism for dropping the grains of corn; and my invention consists in the use of a cut-off which is so formed that it will yield to the grains drawn under it by the slide from either direction, and ride over the grains without shearing them; and, also, in the device for regulating the size of the openings in the dropper-plate, and in the device for regulating the elasticity or tension of the spring cut-off.

The precise character of these devices will be illustrated and defined in the following description and claims.

In the annexed drawings, making part of this specification, Figure I is a plan view of the hopper, showing the cut-off and hole in the dropper. Fig. II is a vertical section of the same; and Fig. III is a perspective view of the dropper-plate, showing the device for regulating the size of the opening.

The same letters are employed in all the figures in the indication of identical parts.

My invention is applicable to any corn-planter. I have illustrated it as applied to an ordinary double check-row planter, in which the dropping apparatus is actuated by the alternate action of a hand-lever, bringing a hole in the dropper-plate into register with the opening through the bottom of the hopper with each single movement of the lever.

Figure 1:
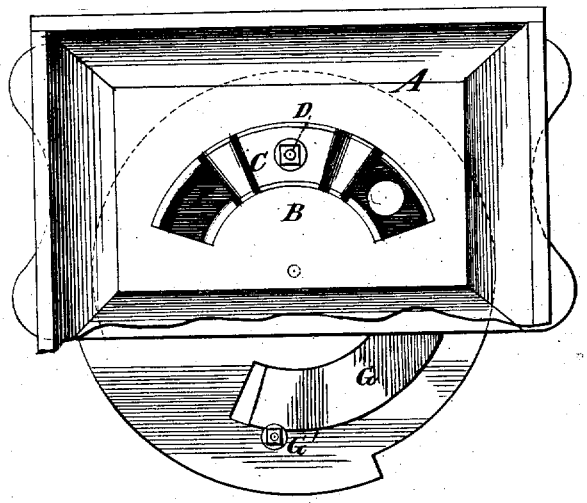
Figure 2:
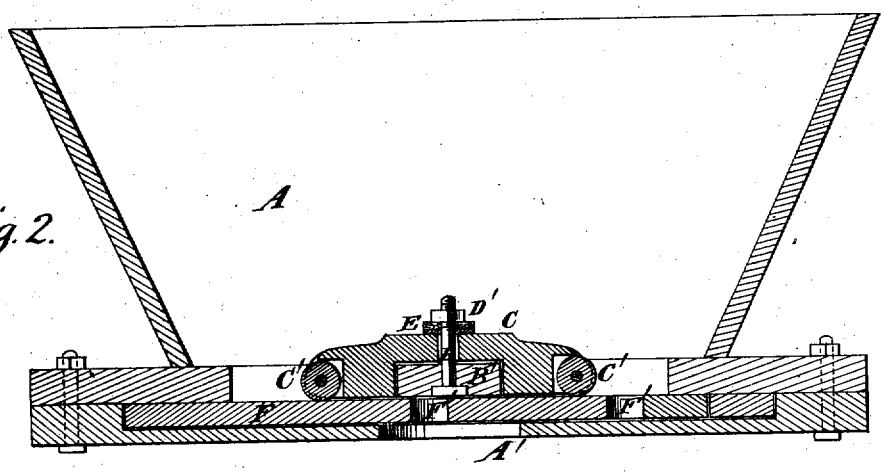
Figure 3:
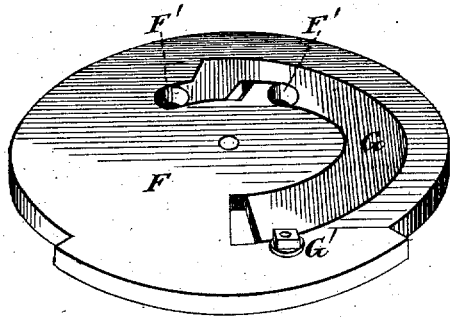

A is the hopper or seed-box, having an opening at A′, through which the grains fall into the furrow. B is a cut-off plate in the bottom of the hopper, having an opening for the passage of the grain from the hopper to the dropper-plate, which is immediately under the plate B, and to receive the cut-off C. The slot in the cut-off plate B is not continuous, but is formed on each side of the cross-bar B′, over which the cut-off C extends, as clearly shown in Fig. 2. Each end of the cut-off rests on the dropper-plate F. A bolt, D, is extended upward through the cross-bar B′, and passes through the middle of the cut-off C. A nut, D′, is screwed down on an india-rubber spring, E, and washer above the cut-off, so that the elasticity or tension of the spring may be increased or diminished, as may be desired. Rollers C′ C′ are placed in the ends of the cut-off, and are intended to run over the grains of corn in the holes of the dropper-plate F.

The cut-off performs the ordinary function of limiting the number of seeds falling through the dropper at each movement; and in order that grains projecting above the surface of the dropper-plates may not be sheared off or crushed, the cut-off, oscillating or rising on the bolt D, will rise at the end, rising over such grains as the spring E will allow, and the play between the bolt and the hole through the cut-off permits. When the grains fall through the hole A′, the spring E will bring back the cut-off to rest on the plate F.

Should the grain not fall out of the holes in the dropper-plate they will lift the other end of the cut-off, or sustain the cut-off without being injured.

F is the dropper-plate. It receives a to-and-fro motion from each movement of the hand-lever, and has two openings at F′ F′, for feeding the grains from the hopper to the hole at A′.

To regulate the size of these holes, and thus control the number of grains fed to each hill, a plate, G, in form a semicircle, is set in a corresponding slot in the dropper-plate. Segmental recesses are formed in G, as shown, in positions corresponding to the holes F′ F′.

By moving the plate G, the size of these holes may be regulated.

A thumb-nut, G′, holds the plate G when properly adjusted.

What I claim as my invention, and desire to secure by Letters Patent, is—

1. In combination with the oscillating dropper-plate F, a cut-off, C, having rollers C′ at each end, bearing on the hopper-plate, to regulate the passage of seeds from the hopper to the hole A, substantially as set forth.

2. The semicircular plate G, for regulating the discharge-orifices F′, substantially as set forth.

3. A cut-off, bearing at both ends in cutting off grains in the dropper plate, in combination with a centrally-placed spring, bearing with adjustable tension against the cut-off, so that there shall be an equal and adjustable pressure on each end of the cut-off applied to grains coming under the cut-off from either side, substantially as set forth.

4. The combination of the centrally-supported and arched cut-off C and spring E with a cut-off plate having openings adjacent to either end of the cut-off, substantially as set forth.

5. A cut-off plate having vertical bearing against a spring and centrally supported in such manner that it may yield vertically, or recede at either end, or uniformly along its entire length, substantially as set forth.

In testimony whereof I have hereunto set my name in presence of two subscribing witnesses.

D. W. JACOBY.

Signed in our presence:
H. S. MOUSER,
M. G. BAKER.